United States Patent
Haladker et al.

(10) Patent No.: US 12,242,018 B2
(45) Date of Patent: Mar. 4, 2025

(54) OBJECT SCREENING SYSTEM AND METHOD

(71) Applicant: INSTILLMOTION HOLDINGS PTE LTD, Singapore (SG)

(72) Inventors: Hersh Haladker, Telangana (IN); Ramesh Talada, Telangana (IN); Monish Saxena, Telangana (IN)

(73) Assignee: INSTILLMOTION HOLDINGS PTE LTD, Singapore (SG)

( * ) Notice: Subject to any disclaimer, the term of this patent is extended or adjusted under 35 U.S.C. 154(b) by 0 days.

(21) Appl. No.: 18/235,521

(22) Filed: Aug. 18, 2023

(65) Prior Publication Data
US 2024/0061142 A1 Feb. 22, 2024

(30) Foreign Application Priority Data
Aug. 22, 2022 (IN) .............................. 202241047544

(51) Int. Cl.
G01V 5/22 (2024.01)
B07C 5/34 (2006.01)

(52) U.S. Cl.
CPC .............. *G01V 5/22* (2024.01); *B07C 5/3412* (2013.01); *B07C 5/3416* (2013.01)

(58) Field of Classification Search
CPC .......... G01V 5/22; G01V 5/20; B07C 5/3412; B07C 5/3416; G06Q 10/087; B64F 1/368
See application file for complete search history.

(56) References Cited

U.S. PATENT DOCUMENTS

2021/0312201 A1* 10/2021 Hastings ................ G06V 20/10

* cited by examiner

*Primary Examiner* — Jacob S. Scott
*Assistant Examiner* — Miraj T. Patel
(74) *Attorney, Agent, or Firm* — Ice Miller LLP (57) ABSTRACT

Embodiments herein disclose an object screening system and method. The object screening system includes a scanner grid configured to parallelly scan a plurality of objects received via a receiving conveyor line, where the scanner grid includes a plurality of scanners arranged in a predetermined configuration selected to substantially reduce a scanning time of the plurality of objects. A distribution module configured to determine a distribution pattern for the plurality of objects received via the receiving conveyor line and to selectively direct each of the plurality of objects to respective input conveyor lines of one or more scanners in accordance with the distribution pattern. A processing unit configured to receive a data package corresponding to each of the scanned objects from the one or more scanners and to process the data package to identify a risk category of the objects based on the data package.

20 Claims, 5 Drawing Sheets

OBJECT SCREENING SYSTEM AND METHOD

CROSS-REFERENCE TO RELATED APPLICATIONS

This application claims priority to Indian Application No. 202241047544, filed Aug. 22, 2022, the disclosure of which is hereby incorporated by reference in its entirety.

FIELD OF INVENTION

Embodiments of the present invention generally relate to methods and systems for screening or scanning objects, and more particularly for systems and methods for optimizing screening of objects.

BACKGROUND

The following background discussion includes information that may be useful in understanding the present invention. It is not an admission that any of the information provided herein is prior art or relevant to the presently claimed invention, or that any publication specifically or implicitly referenced is prior art.

A variety of scanning systems such as X-ray scanning systems, Computerized Tomography (CT) scanning systems are currently used for scanning objects such as for baggage inspection at a facility (e.g., airport, train station, shopping malls or the like) to detect and/or scan presence of prohibited items that may be present in baggage or luggage. Such inspection system scan baggage/s moving on conveyors to and through the scanning systems.

Increased globalization and rapid industrialization are some of the factors contributing to frequent movement of goods and people across countries. With air travel becoming a popular mode for travelling from one destination to another, airports are handling increasing numbers of travelers passing through them. In addition, airports may experience higher volume of travelers during specific periods such as weekends, holiday seasons and end of the year.

Security screening checkpoints used in current security and inspection systems predominately operate using a single input and single output line approach. Each item must be thoroughly and individually scanned using a conventional X-ray or CT scanning system. In an example, for airports that are already in operation, the airport floorplan design may not have room to accommodate installation of additional X-ray or CT scanning systems to handle the increased number of passengers passing through.

In addition, complex security protocols being instituted at airports further require individuals to have each of their belongings, including laptops, shoes, coats, mobile phones, keys, and other items scanned for identifying potential hazardous objects or materials. It takes a considerable amount of time for individuals to remove their belongings and to remove items such as laptops, other digital devices etc., from their cases as required by the governing rules of the airport authorities.

Typically, the scanning and inspection process includes serial scanning of the objects or trays carrying these objects on conveyor lines and the respective passengers need to wait in the queue, sometimes leading to high waiting periods. During periods of high passenger volumes, this presents a big challenge in terms of preventing overcrowding at baggage scan entry points. This in turn, may pose a security issue and lead to a compromise in the quality of security scanning of the objects as security personnel are under pressure to process a large volume of baggage in a short time.

Moreover, overcrowding at entry points to the baggage scanning and inspection systems may result in delay in the movement of passengers across designated sections of the airport and lead to poor passenger experience at the airport. Passengers often find that more time is spent waiting in queue to access the baggage scanning and inspection system rather than the actual scanning process. Also, once passengers are directed away for their physical security check, a buildup of scanned baggage of these passengers can happen at an exit end of the baggage scanning and inspection system. In some cases, an operator of the scanning and inspection system may need to stop accepting new baggage for scanning and wait until such back-up of scanned baggage is cleared.

There is a challenge in maintaining high throughput of baggage scanning while still maintaining good inspection quality particularly in view of the limitation of floor space and restrictions in changing of the floor plan design of operating airports. The scanning and inspection systems should be efficient and at the same time must be capable of inspecting volume of baggage in a short period of time.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, an object screening system is disclosed. The object screening system includes a scanner grid configured to parallelly scan a plurality of objects received via a receiving conveyor line. The plurality of objects includes baggage to be screened at a facility and wherein each of the plurality of objects is placed in a designated tray received on the receiving conveyor line. The scanner grid includes a plurality of scanners arranged in a pre-determined configuration selected to substantially reduce a scanning time of the plurality of objects. Further, the object screening system includes a distribution module configured to determine a distribution pattern for the plurality of objects received via the receiving conveyor line and to selectively direct each of the plurality of objects to respective input conveyor lines of one or more scanners in accordance with the distribution pattern. Further, the object screening system includes a processing unit configured to receive a data package corresponding to each of the scanned objects from the one or more scanners and to process the data package to identify a risk category of the objects based on the data package. Further, the object screening system includes a sorting unit configured to direct each of the scanned objects to a safe object conveyor line or a recheck object conveyor line based on the identified risk category. Further, the object screening system includes an output conveyor line configured to receive scanned objects from each of the safe object conveyor lines of each of the one or more scanners.

The system further includes a tag identification reader configured to identify a tag associated with each object or a tray holding the object, and an annotation client configured to receive the tag from the tag identification reader and to analyse images of the corresponding scanned object and to present details of the scanned object to a user to determine the risk category of the scanned object. The annotation client is configured to assign a high risk category to the scanned object if the user fails to assign the risk category for the object within a pre-determined time period, wherein the high risk category corresponds to objects selected from a list of prohibitory items assigned by the user of the facility. The system includes a recheck module configured to access images of objects received via the recheck object conveyor line and present to a user of the system to facilitate the user to recheck contents of the baggage.

According to another example embodiment, an object screening system is disclosed. The object screening system includes a scanner grid configured to parallelly scan a plurality of objects received via a receiving conveyor line. The scanner grid includes at least a first scanner and a second scanner, where the second scanner is disposed at an elevated level as compared to the first scanner. Further, the object screening system includes a distribution module configured to determine a distribution pattern for the plurality of objects received via the receiving conveyor line and to selectively direct each of the plurality of objects to respective input conveyor lines of the first and second scanners in accordance with the distribution pattern. The pattern comprises a priority preference corresponding to the first and second scanners. Further, the object screening system includes a processing unit configured to receive a data package corresponding to each of the scanned objects from the first and second scanners and to process the data package to identify a risk category of the objects based on the data package. The data package comprises an object identifier, one or more images of the scanned objects, meta data corresponding to the scanned objects, or combinations thereof. Further, the object screening system includes a sorting unit configured to direct each of the scanned objects to a safe object conveyor line, or a recheck object conveyor line based on the identified risk category. Further, the object screening system includes an output conveyor line configured to receive scanned objects from each of the safe object conveyor lines of each of the two scanners. The output conveyor line is positioned at the same level as the receiving conveyor line.

According to another example embodiment, a computer-implemented method for object scanning is disclosed. The method includes scanning a plurality of objects received via a receiving conveyor line via a scanner grid. The scanner grid includes a plurality of scanners arranged in a pre-determined configuration selected to substantially reduce a scanning time of the plurality of objects. Further, the method includes determining a distribution pattern for the plurality of objects received via the receiving conveyor line and selectively directing each of the plurality of objects to respective input conveyor lines of one or more scanners in accordance with the distribution pattern. The method includes processing a data package corresponding to each of the scanned objects from the one or more scanners and identifying a risk category of the objects based on the data package. The method includes directing each of the scanned objects to a safe object conveyor line, or a recheck object conveyor line based on the identified risk category. The method includes receiving each of the scanned objects from each of the safe object conveyor lines of each of the one or more scanners.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein. On the contrary, example embodiments are to cover all modifications, equivalents, and alternatives thereof.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but also have additional steps not included in the figures. It should also be noted that in some alternative implementations, the functions/acts/steps noted may occur out of the order noted in the figures. For example, two figures shown in succession may, in fact, be executed substantially concurrently or may sometimes be executed in the reverse order, depending upon the functionality/acts involved.

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or a section. Thus, a first element, component, region, layer, or section discussed below could be termed a second element, component, region, layer, or section without departing from the scope of example embodiments.

Spatial and functional relationships between elements (for example, between modules) are described using various terms, including "connected," "engaged," "interfaced," and "coupled." Unless explicitly described as being "direct," when a relationship between first and second elements is described in the description below, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless specifically stated otherwise, or as is apparent from the description, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments of the present description provide computer-implemented method and system for efficient object scanning in a variety of environments such as airports, retail outlets, hospitals and so forth.

In an example, the present invention is directed towards an integrated high throughput baggage screening, scanning, or inspection system and methods thereof. Although the system of the present invention has many applications in different environments that require object screening, an exemplary embodiment will be described with reference to its application to an airport security/scanning system. One of ordinary skill in the art would appreciate the present invention may be applied to shopping malls, government buildings, ferry ports, schools, retail outlets, medical facilities, manufacturing units, or the like.

It should be noted that the terms "object screening system" and "object scanning system" are used interchangeably in the present disclosure. The terms "passenger," and "people" are used interchangeably in the patent disclosure. The terms "object," "baggage," and "baggage" are used interchangeably in the patent disclosure.

Figure 1:
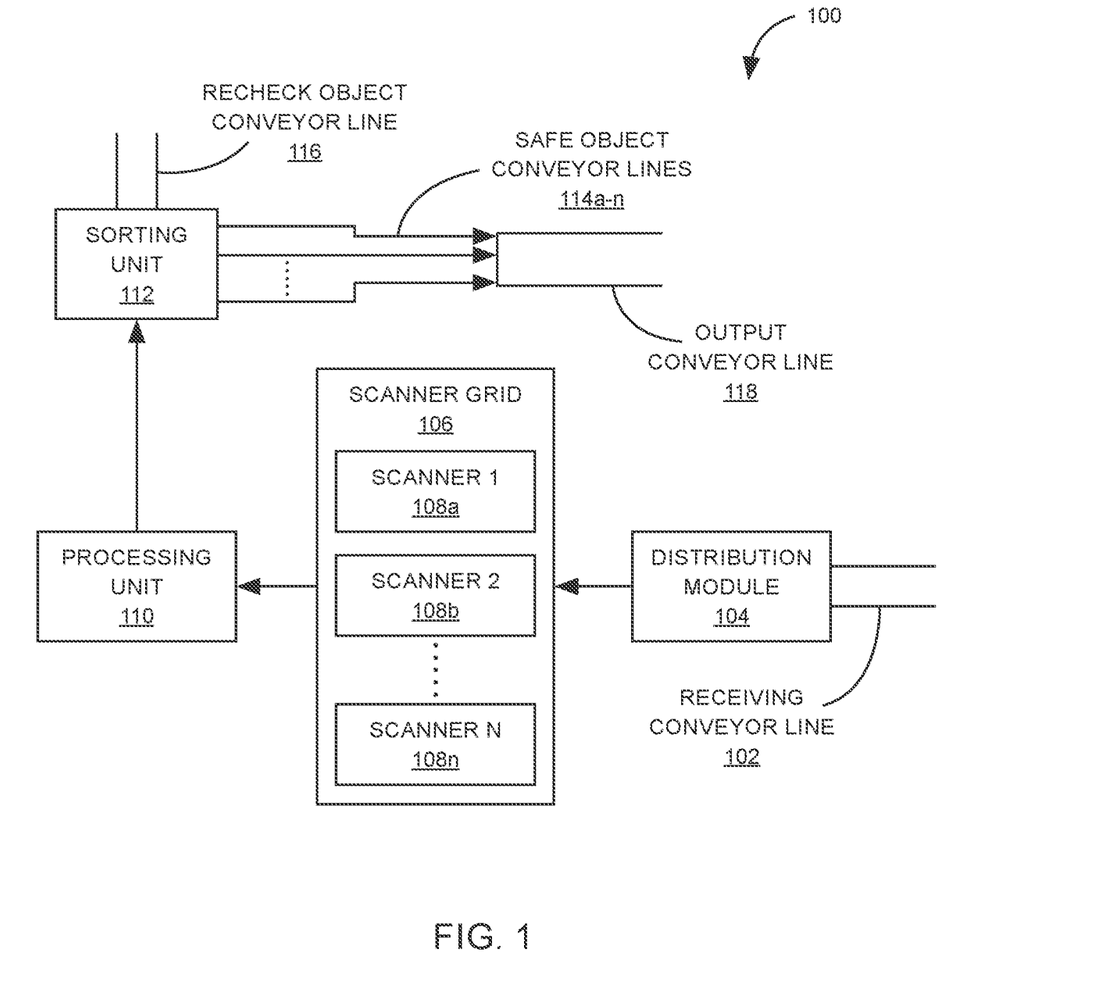
FIG. 1 is a block diagram illustrating an example object screening system, according to some aspects of the present description.

FIG. 1 is a block diagram illustrating an example object screening system 100, according to some aspects of the present description. In an embodiment of the present invention, the object screening system 100 includes a receiving conveyor line 102, a distribution module 104 and a scanner grid 106. The scanner grid 106 includes a plurality of scanners such as represented by reference numerals 108a-108n. The object screening system 100 further includes a processing unit 110, a sorting unit 112, one or more safe object conveyor lines such as represented by reference numerals 114a-114n, a recheck object conveyor line 116 and an output conveyor line 118.

In general, the system 100 may be used at a facility that requires scanning of objects/baggage without opening or tempering the objects. For example, the system 100 may be used at an airport, where passengers are required to deposit objects such as their hand-baggage as well as personal items in designated trays placed on the receiving conveyor line 102 for their baggage to be inspected by inspection officers for detecting any prohibited or restricted objects. In an implementation, the receiving conveyor line 102 is coupled to one or more unpacking spaces for passengers to unpack their baggage and/or load their baggage onto an empty tray that can be retrieved from an empty tray collection point.

In general, such trays are physical containers that hold the passengers baggage as it passes through the object scanning system 100. In some embodiments, trays are individually identifiable using embedded RFID tags. The trays are configured for multiple use, so one could expect the same tray to pass through the object scanning system 100 a number of times during a day.

The receiving conveyor line 102 receives a plurality of objects. The plurality of objects comprises baggage to be a screened at a facility. As used herein, the term "baggage" refers to any type of carry-on item or personal items by passengers that requires inspection. Examples of such baggage include, but are not limited to, luggage, wallet, briefcases, handbags, belts, watches, and electronic devices. The facility can be, for example, but not limited to, an airport, a shopping mall, a retail outlet, a medical facility, a manufacturing unit, or the like. Each of the plurality of objects is placed in a designated tray that is received on the receiving conveyor line 102.

The receiving conveyor line 102 is communicatively coupled to the distribution module 104. The distribution module 104 determines a distribution pattern for the plurality of objects received through the receiving conveyor line 102 and selectively directs each of the received plurality of objects to respective input conveyor lines of one or more scanners 108a-108n of the scanner grid 106 in accordance with the distribution pattern.

In this embodiment, the plurality of scanners 108a-108n are arranged in a pre-determined configuration selected to substantially reduce a scanning time of the plurality of objects. In an embodiment, the scanner grid 106 comprises at least one scanner disposed at a first level above ground and at least one scanner disposed at a second level. Here, the second level is elevated compared to the first level. Such a configuration substantially reduces the scanning time of the objects received via the receiving conveyor line 102.

In one example, the distribution pattern includes a priority preference for the scanners 108a-108n disposed at the first and second levels and the distribution module 104 is configured to selectively direct each of the plurality of objects received via the receiving conveyor line 102 to respective input conveyor lines of one or more scanners 108a-108n in accordance with the priority preference.

In an embodiment, the distribution module 104 is configured to determine the distribution pattern for the plurality of objects based on a load of each of the input conveyor lines of the one or more scanners 108a-108n, a scanning frequency of the scanners 108a-108n, a user input, a condition and/or efficiency level of the plurality of scanners 108a-108n, or combinations thereof. In one embodiment, a user of the system 100 may provide the distribution pattern to the distribution module 104.

The distribution module 104 is communicatively coupled to the scanner grid 106. The scanner grid 106 parallelly scans the plurality of objects received through the receiving conveyor line 102 thereby reducing the scanning time. The scanner grid 106 includes the plurality of scanners 108a-108n arranged in a pre-determined configuration selected to substantially reduce a scanning time of the plurality of objects. The plurality of scanners 108a-108n can be, for example, but not limited to image processing scanners, weight measuring scanners, laser scanners and the like such as deployed for scanning baggage.

In an implementation, the scanner grid 106 includes at least one scanner 108a-108n disposed at a first level above ground and at least one scanner disposed at a second level. Here, the second level is elevated compared to the first level. The second level is directly above the first level, or the first and second levels are arranged in a staggered configuration (e.g., vertically staggered configuration, horizontally staggered configuration, and the like). In another implementation, the at least one scanner 108a-108n is elevated above ground so that it does not occupy a limited floorspace of the facility where it is installed such as an airport or train station. In another embodiment, at least one scanner of the scanner grid 106 is disposed above a human security inspection frame configured to perform security screening of persons entering the facility.

The distribution module 104 is equipped with a programming logic and control (PLC) code to determine whether a tray of baggage received at the distribution module 104 is to be directed to a first scanner 108a via a first scanning conveyor line or the second scanner 108b via a second scanning conveyor line. The PLC code may decide the route of the trays based on the rate of traffic of baggage at the first scanning conveyor line and the second scanning conveyor line.

In this embodiment, the processing unit 110 receives a data package corresponding to each of the scanned objects from the one or more scanners 108a-108n and processes the data package to identify a risk category of the objects based on the data package. The data package corresponding to each of the scanned objects comprises an object identifier, a tray identifier, one or more images of the scanned objects, meta data corresponding to the scanned objects, or combinations thereof.

The processing unit 110 may comprise an in-house processor. In an embodiment, the processing unit 110 processes the data package at a server (not shown) located at a remote location and coupled with a network switch, wherein the processing unit 110 generates flow instructions for the scanned objects based on the determined risk category and transmits the flow instructions to the sorting unit 112. The processing unit 110 is further configured to transmit the data package of the scanned objects on-demand to a plurality of interfaces accessed by the users and to notify the users once the data is available to be accessed.

The processing unit 110 is further communicatively coupled to the sorting unit 112. The sorting unit 112 directs each of the scanned objects to one or more safe object conveyor lines 114a-114n or a recheck object conveyor line 116 based on the identified risk category. Each of the safe object conveyor lines 114a-114n is coupled with the output conveyor line 118. The output conveyor line 118 receives the scanned objects from each of the safe object conveyor lines 114a-114n. In this embodiment, the output conveyor line 118 is disposed at the same level as the receiving conveyor line 102 and receives the scanned objects from the scanners 108a-108n disposed on the first and second levels.

Further, the output end of the object screening system 100 includes a retrieval point (not shown) for passengers to retrieve their scanned baggage. The retrieval point of the object screening system 100 includes a plurality of platforms to accommodate multiple passengers to pack their scanned baggage simultaneously ensuring convenient passenger experience. The object screening system 100 substantially reduces manpower required to return the trays from output end to the input end of the object screening system 100.

Figure 2:
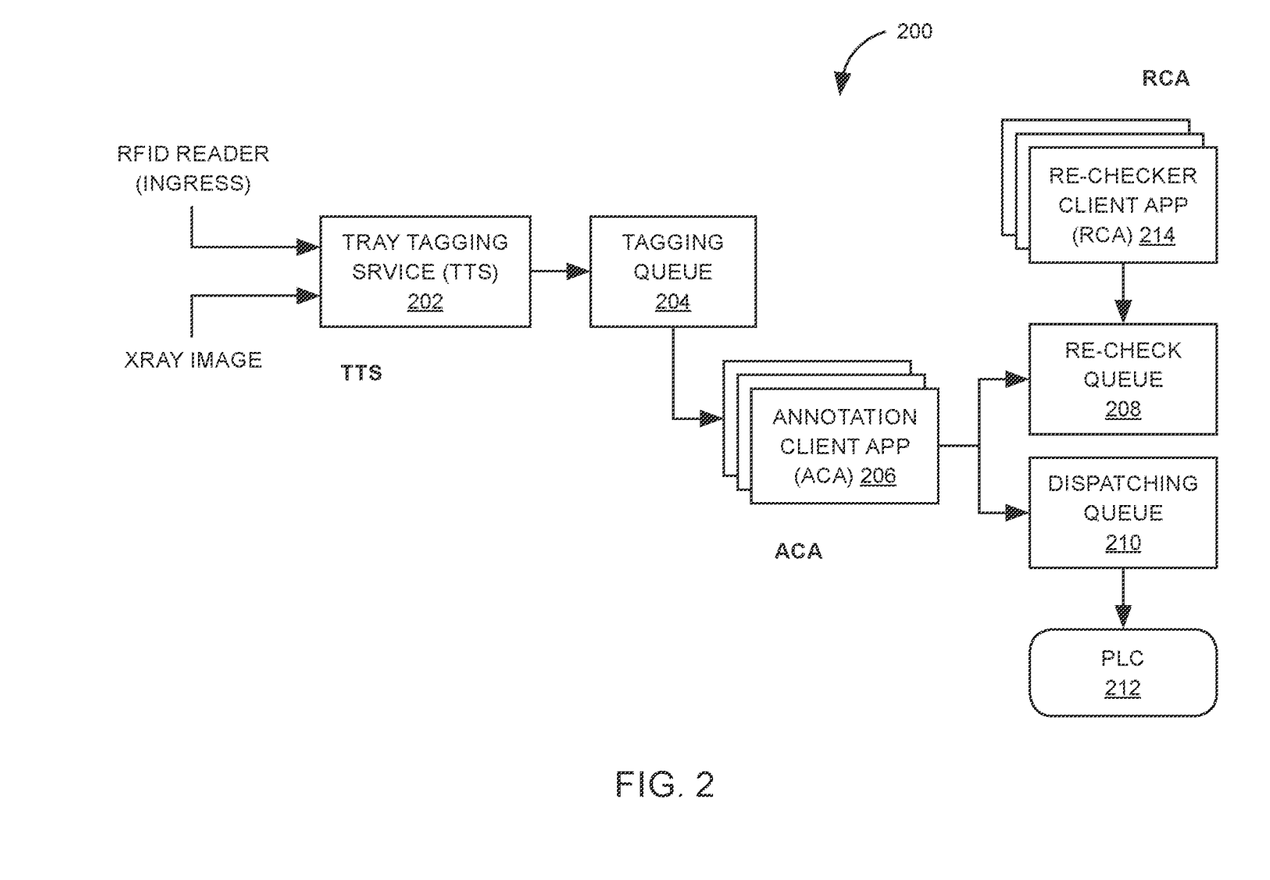
FIG. 2 is a block diagram illustrating modules of the object screening system for tagging and screening of objects, according to some aspects of the present description.

FIG. 2 is a block diagram illustrating example modules 200 of the object screening system 100 for tagging and screening of objects received by the system 100, according to some aspects of the present description. As illustrated in FIG. 2, the object screening system 100 includes a tray tagging service (TTS) service module 202, a tagging queue module 204, an annotation client application 206, a recheck module 208, a dispatching queue module 210, a PLC 212 and a re-checker client application 214.

The TTS service module 202 includes a tag identification reader such as a RFID reader configured to identify a tag associated with each object or a tray holding the object. In operation, the TTS service module 202 is configured to process an x-ray image and a RFID reader and integrates the image captured to a tray tag of the tray carrying the object to be scanned. The TTS service module 202 is coupled to the tagging queue module 204 that is configured to queue all the images received from the scanner grid 106 for further processing.

In the illustrated embodiment, the annotation client application 206 is installed and implemented on a computer system. The annotation client application 206 receives the tag from the tag identification reader through the tagging queue module 204 and analyses images of the corresponding scanned object. Moreover, the annotation client application 206 is configured to present details of the scanned object to a user to determine the risk category of the scanned object. In one example, the annotation client application 206 assigns a high-risk category to the scanned object if the user fails to assign the risk category for the object within a predetermined time period. Here, the high-risk category corresponds to objects selected from a list of prohibited items assigned by the user of the facility. Such identified objects may be directed to the recheck module for validation of the risk category of the objects.

The recheck module 208 accesses images of objects received via the recheck object conveyor line 116 and presents the images to a user of the system 100 to facilitate the user to recheck contents of the baggage. The dispatching queue module 210 is configured to dispatch the scanned objects to the safe object conveyor line 114a-114n or the recheck object conveyor line 116 based on the identified risk category. The re-checker client application 214 may be installed at each rechecking station to facilitate the rechecking of the high-risk objects. The re-checker client application 214 facilitates side-by-side visualization of the Xray image with POI and colour image.

According to an embodiment of the invention, the object screening system 100 further comprises programming logic and controls (PLC) 212 to efficiently distribute the trays of baggage among the scanners 108a-108n where applicable to ensure maintenance of a constant buffer between trays of baggage at the input of each scanner 108a-108n at any given time, thus, making the system substantially efficient.

Further, the PLC 212 is adapted to optimize the overall rate of baggage scanning by taking into account the rate of scanning performed by each scanner 108a-108n and adjusting the rate of trays of baggage distributed to each scanning conveyor line. In this embodiment, an overall rate of baggage scanned is optimized by distributing objects to multiple trays of baggage to enable faster progressing scanning conveyor lines.

According to another embodiment of the object screening system, the system 100 may include one or more tagging device reader-writers (e.g., RFID reader-writers or the like) positioned at an entry and an exit of each scanner 108a-108n. The object scanning system 100 can store this information for a pre-determined period of time for future reference or use. The object scanning system 100 provides an easy-to-view-and-generate report containing several metrics to enhance the object scanning system performance.

Figure 3:
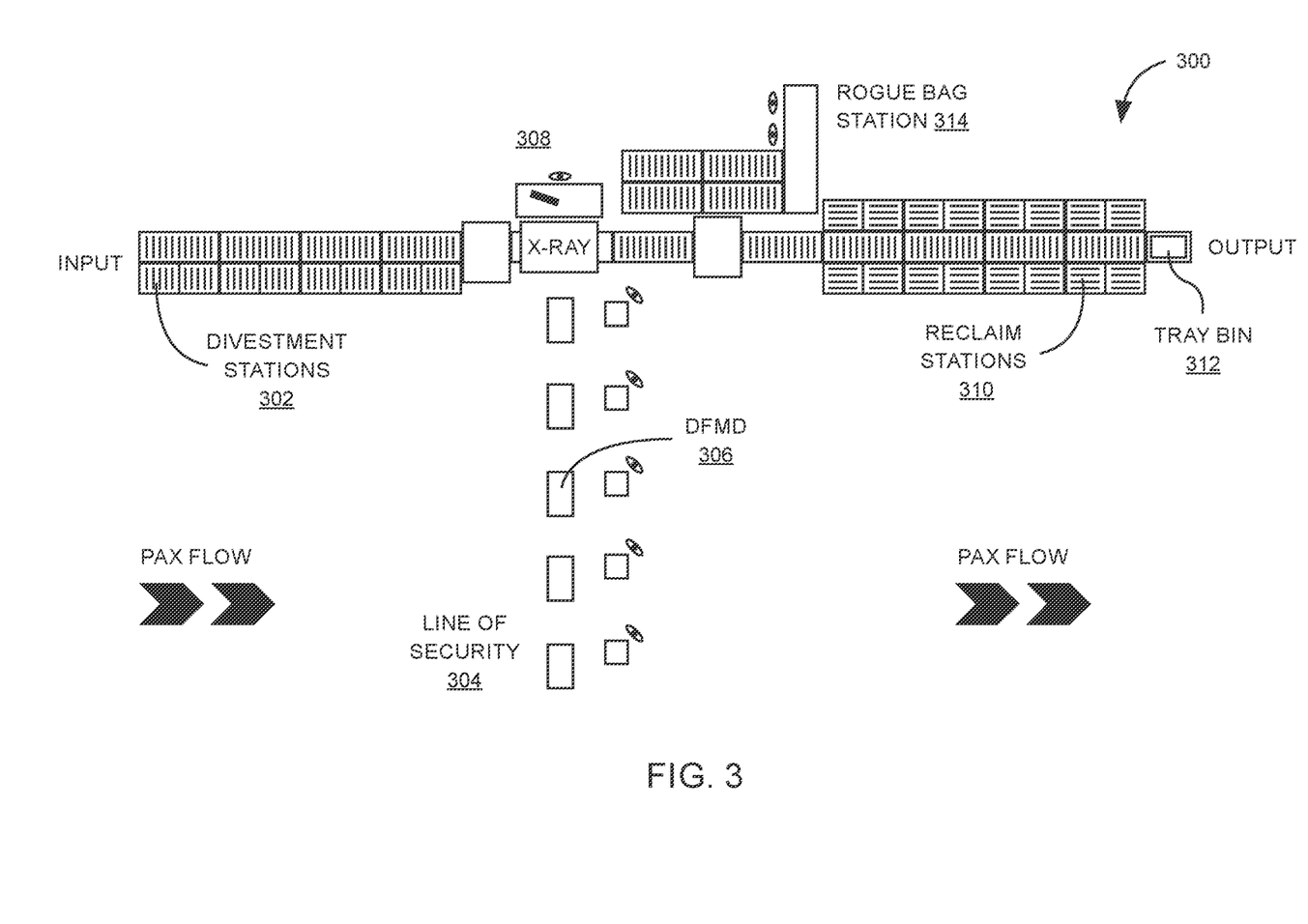
FIG. 3 is a top view of the object screening system of FIG. 1, according to some aspects of the present description.

FIG. 3 is a top view 300 of the object screening system 100 of FIG. 1, according to some aspects of the present description. As illustrated in FIG. 3, the operation and function of the object scanning system 100 are explained with respect to a system deployed in an airport terminal. Similar operation and functions are applicable to other facilities (e.g., metro station, shopping mall and the like) with required customization. In an embodiment, the object scanning system 100 includes one or more divestment stations 302, a line of security region 304, a door frame metal detector (DFMD) 306, an X-ray station 308, a reclaim station 310, a tray bin 312, and a rogue bag station 314.

The divestment station 302, the DFMD 306, the X-ray 308, the reclaim station 310, the tray bin 312, and the rogue bag station 314 are located in the line of security region 304 at the airport. As part of a divestment process, staff members may be present at the divestment station 302 to assist the passengers in divesting their objects and loading their carts for efficient passage through security check points and proper scanning. The divestment station 302 typically may have benches, seats, and tables that facilitate easy removal of personal items from carry-on baggage and other locations and for placing items in security bins.

Further, the DFMD 306 detects any high risk object (e.g., metal item or the like) in the line of security region 304. In operation, each passenger must remove certain items from their carry-on baggage prior to placing it on trays on the conveyor belt for X-ray scanning using the X-ray 308. Once scanned by the scanners, the reclaim station 310 makes the scanned objects available to the passenger using the tray bin 312. The reclaim station 310 is provided with baggage carrying rollers. The reclaim station 310 may be used for an act of physically searching the passenger's baggage by the security personnel to look for high-risk items detected during the annotation/tagging process. Further, an orphan or rogue bag can then be stored in the rogue bag station 314. The rogue bag station 314 is provided with baggage carrying rollers.

The physical checks of the passenger's baggage are done by recheck-station personnel if it is tagged for a re-check. The recheck-inspector takes hints from the annotated image provided by the inspector to recheck the baggage. There could be more than one recheck-inspector. Each recheck-inspector performs physical checks at their dedicated recheck station.

Figure 4:
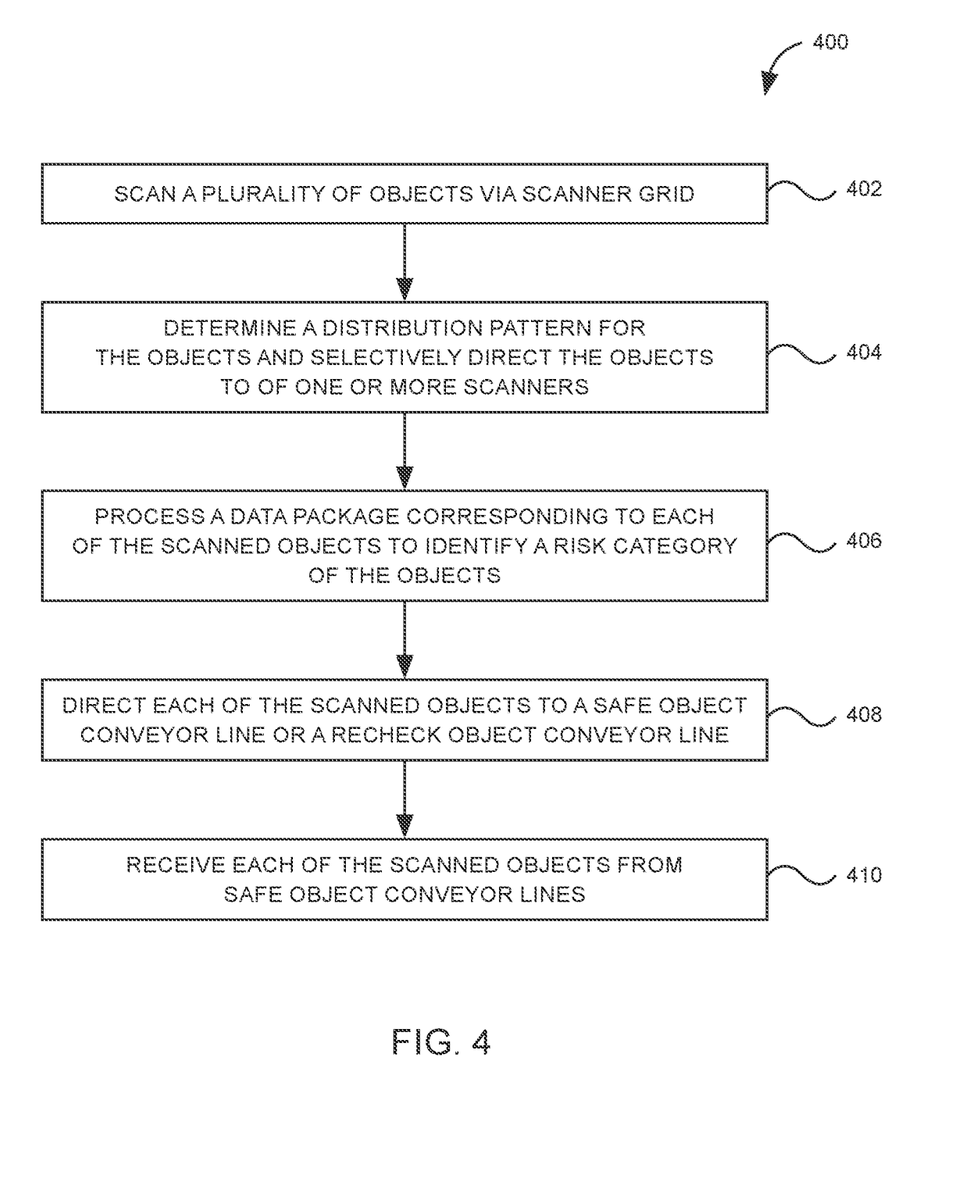
FIG. 4 is a flow chart illustrating a method for screening objects, according to some aspects of the present description.

FIG. 4 is a flow chart illustrating a method for screening objects, according to some aspects of the present description. The various operations/steps (402-410) are handled by the various modules of the object scanning system 100 such as described with reference to FIGS. 1-3.

At step 402, scanning of a plurality of objects received via the receiving conveyor line 102 is performed via the scanner grid 106. The operations and the functions of the conveyor line 102 and the scanner grid 106 are described with reference to FIG. 1.

At step 404, a distribution pattern for the plurality of objects is determined and each of the plurality of objects are selectively directed to respective input conveyor lines of one or more scanners 108a-108n in accordance with the determined distribution pattern.

At step 406, data package corresponding to each of the scanned objects from the one or more scanners 108a-108n is processed and risk category of the objects are identified.

At step 408, each of the scanned objects are directed to the safe object conveyor line 114a-114n or the recheck object conveyor line 116 based on identified risk category.

At step 410, each of the scanned objects are received from each of the safe object conveyor line 114a-114n.

The various actions, acts, blocks, steps, or the like in the flow chart (400) may be performed in the order presented, in a different order or simultaneously. Further, in some embodiments, some of the actions, acts, blocks, steps, or the like may be omitted, added, modified, skipped, or the like without departing from the scope of the invention.

Figure 5:
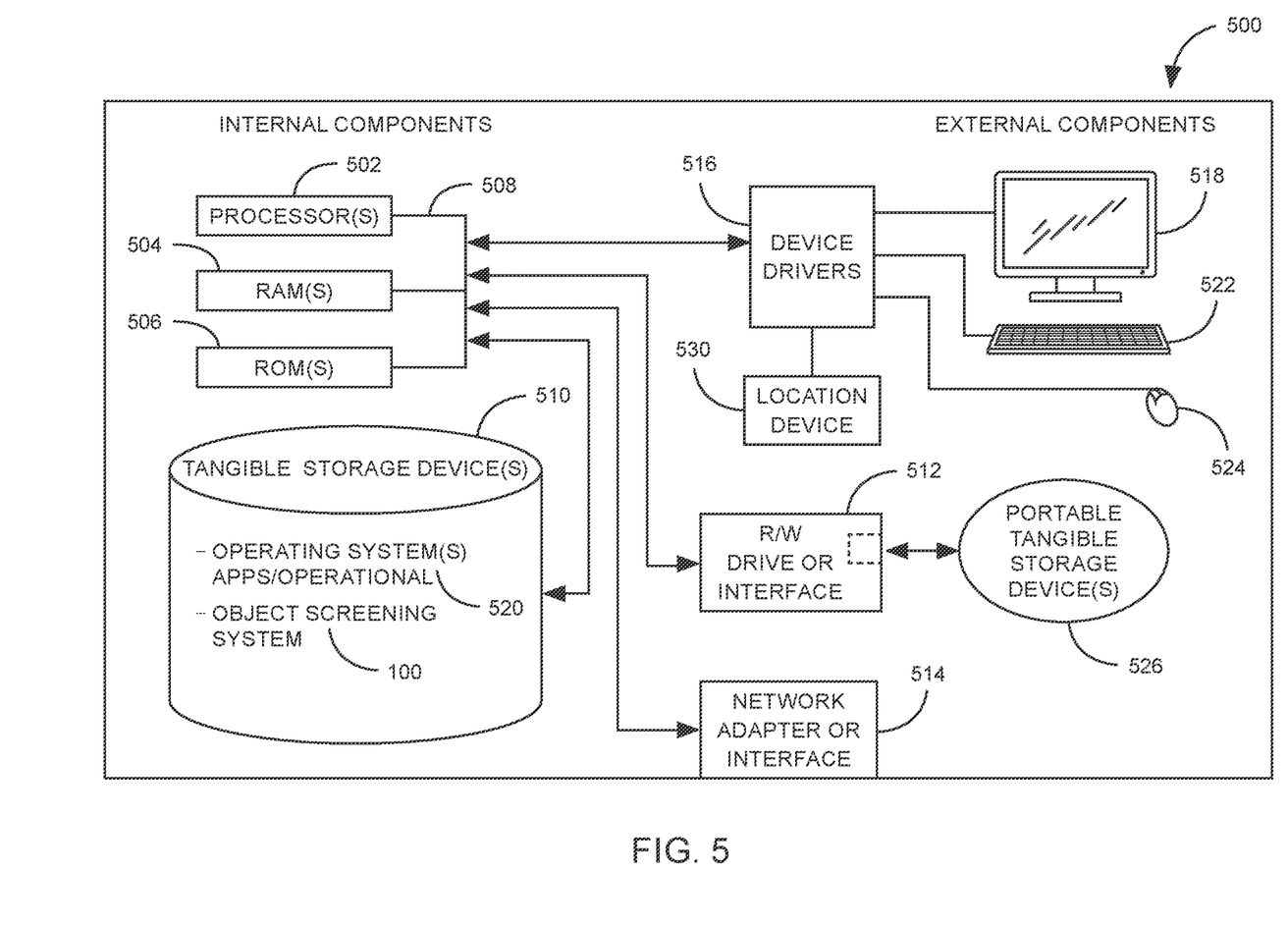
FIG. 5 is a block diagram illustrating an example computer system, according to some aspects of the present description.

FIG. 5 is a block diagram illustrating an example computer system 500, according to some aspects of the present description. Examples of such computer system 500 include without limitation, workstations, personal computers, desktop computers, or other types of generally fixed computing systems such as mainframe computers, servers, and minicomputers. Other examples of such computer system 500 include mobile or portable computing devices, such as one or more laptops, tablet computers, personal data assistants, mobile phones (such as smartphones), IoT devices, wearable electronic devices such as smartwatches, and other mobile or portable computing devices such as embedded computers, set-top boxes, vehicle-mounted devices, wearable computers, etc. Servers can include mail servers, file servers, database servers, virtual machine servers, and web servers.

Based on the identified risk category, the output of the safe object conveyor line 114a-114n or the recheck object conveyor line 116 is provided with the computer system 500. The identified risk category and other relevant information may store in a storage (e.g., disk drives, storage arrays (e.g., storage-area network (SAN) and/or network-attached storage (NAS) technology), semiconductor memory (e.g., solid-state storage devices), network-attached storage (NAS) devices, tape libraries, or other magnetic, non-tape storage devices, optical media storage devices, or combinations thereof. In some embodiments, storage is provided in a cloud storage environment (e.g., a private cloud or one operated by a third-party vendor).

The various components in the computer system 500 may communicate through the network(s) (not shown) and/or locally. It should be noted that a computer system environment may include a plurality of networks to connect different components of the system environment. In one embodiment, the network(s) use standard communications technologies and/or protocols. Thus, the network(s) can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network(s) can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

The training module is configured to train an artificial intelligence (AI) model based on historical data corresponding to identified risk category of one or more training datasets. Non-limiting examples of the AI model include time series forecasting models such as an autoregressive integrated moving average (ARIMA) model or a seasonal autoregressive integrated moving average (SARIMA) model.

The systems and methods described herein may be partially or fully implemented by a special purpose computer system created by configuring a general-purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium, such that when run on a computing device, cause the computing device to perform any one of the aforementioned methods. The medium also includes, alone or in combination with the program instructions, data files, data structures, and the like. Non-limiting examples of the non-transitory computer-readable medium include, but are not limited to, rewriteable non-volatile memory devices (including, for example, flash memory devices, erasable programmable read-only memory devices, or a mask read-only memory devices), volatile memory devices (including, for example, static random access memory devices or a dynamic random access memory devices), magnetic storage media (including, for example, an analog or digital magnetic tape or a hard disk drive), and optical storage media (including, for example, a CD, a DVD, or a Blu-ray Disc). Examples of the media with a built-in rewriteable non-volatile memory, include but are not limited to memory cards, and media with a built-in ROM, including but not limited to ROM cassettes, etc. Program instructions include both machine codes, such as produced by a compiler, and higher-level codes that may be executed by the computer using an interpreter. The described hardware devices may be configured to execute one or more software modules to perform the operations of the above-described example embodiments of the description, or vice versa.

Non-limiting examples of computing devices include a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process and generate data in response to the execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

One example of the computing system 500 is described in FIG. 5. The computing system 500 includes one or more processor 502, one or more computer-readable RAMs 504 and one or more computer-readable ROMs 506 on one or more buses 508. Further, the computing system 500 includes a tangible storage device 510 that may be used to execute operating systems 520 and the object screening system 100. Both, the operating system 520 and object screening system 100 are executed by processor 502 via one or more respective RAMs 504 (which typically includes cache memory). The execution of the operating system 520 and/or the object screening system 100 by the processor 502, configures the processor 502 as a special-purpose processor configured to carry out the functionalities of the operation system 520 and/or the object screening system 100, as described above.

Examples of storage devices 510 include semiconductor storage devices such as ROM 506, EPROM, flash memory or any other computer-readable tangible storage device that may store a computer program and digital information.

Computer system 500 also includes a R/W drive or interface 512 to read from and write to one or more portable computer-readable tangible storage devices 526 such as a CD-ROM, DVD, memory stick or semiconductor storage device. Further, network adapters or interfaces 514 such as a TCP/IP adapter cards, wireless Wi-Fi interface cards, or 3G or 4G wireless interface cards or other wired or wireless communication links are also included in the computer system 500.

In one example embodiment, the information associated with the object screening system 100 may be stored in tangible storage device 510 and may be downloaded from an external computer via a network (for example, the Internet, a local area network or another wide area network) and network adapter or interface 514.

Computer system 500 further includes device drivers 516 to interface with input and output devices. The input and output devices may include a computer display monitor 518, a keyboard 522, a keypad, a touch screen, a computer mouse 524, and/or some other suitable input device.

In this description, including the definitions mentioned earlier, the term 'module' may be replaced with the term 'circuit.' The term 'module' may refer to, be part of, or include processor hardware (shared, dedicated, or group) that executes code and memory hardware (shared, dedicated, or group) that stores code executed by the processor hardware. The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above. Shared memory hardware encompasses a single memory device that stores some or all code from multiple modules. Group memory hardware encompasses a memory device that, in combination with other memory devices, stores some or all code from one or more modules.

In some embodiments, the module may include one or more interface circuits. In some examples, the interface circuits may include wired or wireless interfaces that are connected to a local area network (LAN), the Internet, a wide area network (WAN), or combinations thereof. The functionality of any given module of the present description may be distributed among multiple modules that are connected via interface circuits. For example, multiple modules may allow load balancing. In a further example, a server (also known as remote, or cloud) module may accomplish some functionality on behalf of a client module.

While only certain features of several embodiments have been illustrated and described herein, many modifications and changes will occur to those skilled in the art. It is, therefore, to be understood that the appended claims are intended to cover all such modifications and changes as fall within the scope of the invention and the appended claims.

What is claimed is:

1. An object screening system comprising:
a scanner grid configured to parallelly scan a plurality of objects received via a receiving conveyor line, wherein the scanner grid comprises a plurality of scanners arranged in a pre-determined configuration;
a distribution module configured to determine a distribution pattern for the plurality of objects received via the receiving conveyor line and to selectively direct each of the plurality of objects to respective input conveyor lines of one or more scanners in accordance with the distribution pattern, wherein the receiving conveyor line comprises one or more conveyor lines;
a processing unit configured to receive a data package corresponding to each of the scanned objects from the one or more scanners and to process the data package to identify a risk category of the objects based on the data package;
a sorting unit configured to direct each of the scanned objects to a safe object conveyor line or a recheck object conveyor line based on the identified risk category, wherein the safe object conveyor line comprises one or more conveyor lines; and
an output conveyor line configured to receive scanned objects from each of the safe object conveyor lines of each of the one or more scanners.

2. The object scanning system of claim 1, wherein the plurality of objects comprises baggage to be a screened at a facility and wherein each of the plurality of objects is placed in a designated tray received on the receiving conveyor line.

3. The object scanning system of claim 2, wherein the facility comprises an airport, a shopping mall, a retail outlet, a medical facility, a manufacturing unit, or combinations thereof.

4. The object scanning system of claim 1, wherein the scanner grid comprises at least one scanner disposed at a first level above ground and at least one scanner disposed at a second level, wherein the second level is elevated compared to the first level.

5. The object scanning system of claim 4, wherein the at least one scanner disposed at the second level comprises a scanner placed above a human security inspection frame configured to perform security screening of persons entering the facility.

6. The object scanning system of claim 4, wherein the second level is directly above the first level, or the first and second levels are arranged in a staggered configuration.

7. The object scanning system of claim 4, wherein the output conveyor line is disposed at the same level as the receiving conveyor line and is configured to receive the scanned objects from the scanners on the first and second levels.

8. The object scanning system of claim 4, wherein the distribution pattern comprises a priority preference for the scanners disposed at the first and second levels and the distribution module is configured to selectively direct each of the plurality of objects to respective input conveyor lines of one or more scanners in accordance with the priority preference.

9. The object scanning system of claim 1, wherein the distribution module is configured to determine the distribution pattern for the plurality of objects based on a load of each of the input conveyor lines of one or more scanners, a scanning frequency of the scanners, a user input, a condition and/or efficiency level of the plurality of scanners, or combinations thereof.

10. The object scanning system of claim 1, wherein the data package corresponding to each of the scanned objects comprises an object identifier, a tray identifier, one or more images of the scanned objects, meta data corresponding to the scanned objects, or combinations thereof.

11. The object scanning system of claim 1, wherein the processing unit comprises an in-house processor, or a server located at a remote location and coupled to the system via a network switch, wherein the processing unit is configured to generate flow instructions for the scanned objects based on the determined risk category and transmit the flow instructions to the sorting unit.

12. The object scanning system of claim 1, wherein the system further comprises:
a tag identification reader configured to identify a tag associated with each object or a tray holding the object, and an annotation client configured to:
receive the tag from the tag identification reader;
analyse images of the corresponding scanned object; and
present details of the scanned object to a user to determine the risk category of the scanned object.

13. The object scanning system of claim 12, wherein the annotation client is further configured to assign a high risk category to the scanned object if the user fails to assign the risk category for the object within a predetermined time period, wherein the high risk category corresponds to objects wherein the images of the object display an item selected from a list of prohibitory items assigned by the user of the facility.

14. The object scanning system of claim 12, wherein the system further comprises a recheck module configured to access images of objects received via the recheck object conveyor line and present to a user of the system to facilitate the user to recheck contents of the baggage.

15. The object scanning system of claim 1, wherein the processing unit is further configured to transmit data package of the scanned objects on-demand to a plurality of interfaces accessed by the users and to notify the users once the data is available to be accessed.

16. An object screening system comprising:
   a scanner grid configured to parallelly scan a plurality of objects received via a receiving conveyor line, wherein the scanner grid comprises at least a first scanner and a second scanner, wherein the second scanner is disposed at an elevated level as compared to the first scanner;
   a distribution module configured to determine a distribution pattern for the plurality of objects received via the receiving conveyor line and to selectively direct each of the plurality of objects to respective input conveyor lines of the first and second scanners in accordance with the distribution pattern and wherein the distribution pattern comprises a priority preference corresponding to the first and second scanners;
   a processing unit configured to receive a data package corresponding to each of the scanned objects from the first and second scanners and to process the data package to identify a risk category of the objects based on the data package, wherein the data package comprises an object identifier, one or more images of the scanned objects, meta data corresponding to the scanned objects, or combinations thereof;
   a sorting unit configured to direct each of the scanned objects to a safe object conveyor line, or a recheck object conveyor line based on the identified risk category; and
   an output conveyor line configured to receive scanned objects from each of the safe object conveyor lines of each of the two scanners, wherein the output conveyor line is positioned at the same level as the receiving conveyor line.

17. The object scanning system of claim 16, wherein the first and second scanners are arranged in a vertically staggered configuration.

18. The object scanning system of claim 17, wherein the distribution module is configured to determine the distribution pattern for the plurality of objects based on a load of each of the input conveyor lines of the two scanners, a scanning frequency of the scanners, a user input, a condition and/or efficiency level of the plurality of scanners, or combinations thereof.

19. A computer-implemented method for object scanning, the method comprising:
   scanning a plurality of objects received via a receiving conveyor line via a scanner grid, wherein the scanner grid comprises a plurality of scanners arranged in a pre-determined configuration;
   determining a distribution pattern for the plurality of objects received via the receiving conveyor line and selectively directing each of the plurality of objects to respective input conveyor lines of one or more scanners in accordance with the distribution pattern;
   processing a data package corresponding to each of the scanned objects from the one or more scanners and identifying a risk category of the objects based on the data package;
   directing each of the scanned objects to a safe object conveyor line, or a recheck object conveyor line based on the identified risk category; and
   receiving each of the scanned objects from each of the safe object conveyor lines of each of the one or more scanners.

20. The computer-implemented method of claim 19, further comprising generating flow instructions for the scanned objects based on the determined risk category and directing the objects to the safe object or recheck conveyor lines using the flow instructions.

* * * * *